United States Patent [19]

Malwitz

[11] Patent Number: 4,654,375

[45] Date of Patent: Mar. 31, 1987

[54] FIRE-RETARDANT POLYURETHANE FOAM AND METHOD AND RESIN FOR PREPARING THE SAME

[75] Inventor: Nelson E. Malwitz, Brookfield, Conn.

[73] Assignee: Sealed Air Corporation, Saddle Brook, N.J.

[21] Appl. No.: 847,775

[22] Filed: Apr. 3, 1986

[51] Int. Cl.[4] .............................................. C08G 18/14

[52] U.S. Cl. .................................... 521/107; 106/162; 521/109.1; 521/119; 521/120; 521/123; 521/158

[58] Field of Search ...................... 521/107, 109.1, 119, 521/120, 123, 158; 106/162

[56] References Cited

U.S. PATENT DOCUMENTS

| | | | |
|---|---|---|---|
| Re. 31,757 | 12/1984 | Kennedy | 521/103 |
| 3,004,934 | 10/1961 | Dosmann et al. | 521/109 |
| 3,073,788 | 1/1963 | Hostettler et al. | 521/109 |
| 3,165,508 | 1/1965 | Otey et al. | 260/210 |
| 3,251,785 | 5/1966 | Anderson | 521/109 |
| 3,415,812 | 12/1968 | Turner | 521/109 |
| 3,600,338 | 8/1971 | Molotsky | 521/109 |
| 3,783,133 | 1/1974 | Speranza | 521/175 |
| 3,957,702 | 5/1976 | Molotsky et al. | 521/109.1 |
| 4,216,296 | 8/1980 | Wernsing | 521/175 |
| 4,230,824 | 10/1980 | Nodelman | 521/167 |
| 4,237,182 | 12/1980 | Fulmer et al. | 428/310 |
| 4,374,208 | 2/1983 | Fallows et al. | 521/109 |
| 4,400,475 | 8/1983 | Kennedy | 521/103 |
| 4,404,294 | 9/1983 | Wiedermann | 521/107 |
| 4,417,998 | 11/1983 | Kennedy | 521/175 |
| 4,458,034 | 7/1984 | Fracalossi et al. | 521/107 |
| 4,515,638 | 5/1985 | Kennedy | 106/162 |
| 4,520,139 | 5/1985 | Kennedy | 521/109.1 |
| 4,521,544 | 6/1985 | Kennedy | 521/107 |

*Primary Examiner*—Maurice J. Welsh

*Attorney, Agent, or Firm*—Bell, Seltzer, Park & Gibson

[57] ABSTRACT

A single phase B-side polyurethane resin comprised of a polyol and a carbohydrate is disclosed. The resin is useful for the preparation of flame-retardant polyurethane foams, and can be used to prepare such foams on two-component foaming equipment.

23 Claims, No Drawings

FIRE-RETARDANT POLYURETHANE FOAM AND METHOD AND RESIN FOR PREPARING THE SAME

TECHNICAL FIELD

This invention relates to polyurethane foams containing carbohydrate derivatives as a fire-retardant additive, and particularly relates to foams prepared from a polyurethane resin in which the carbohydrate derivative has been dissolved. Using such carbohydrate-containing resins, polyurethane foams can be produced on foaming equipment which is capable of servicing only two component streams.

BACKGROUND OF THE INVENTION

The storage and distribution environment of commercial goods has been altered radically in the 1980s. With advances in computer technology leading to product miniaturization, products such as office equipment and electronic instrumentation are now stored at a much higher dollar density. In fact, it is not unusual for the value of goods in storage to exceed the value of the warehouse in which they are stored.

Many industries have been forced to consider alternatives to conventional, highly flammable, expanded plastic packaging. The U.S. Navy has expressed a keen interest in the use of materials that will reduce the scale and hazard of shipboard fires. Moreover, requirements for rapid deployment of supplies and hardware have made high density warehousing of packaged goods a way of life for all branches of the armed forces.

Polyurethane foams are excellent packaging materials because of their cushioning ability. Moreover, items to be packaged can be completely encapsulated in protective polyurethane foam with two-component foaming equipment. An advantage of such foaming equipment is its reasonable cost: the equipment need only be capable of handling a polyisocyanate component (the "A-side" polyurethane resin) and a polyol component (the "B-side" polyurethane resin). Equipment capable of handling more than two components is much more expensive. The present invention is not limited to packaging foams but could also be practiced in the entire arena of polyurethane technology including uses for insulation, structural and decorative, elastomers, coatings, etc.

Carbohydrates, because they are charring agents, give polyurethane foams excellent fire-retardant properties when used in conjunction with other fire-retardant chemicals. Unfortunately, carbohydrates heretofore could not be mixed with polyols to form a phase stable B-side polyurethane resin. As a result, expensive foaming equipment capable of servicing more than two component streams had to be used.

The resolution of this problem is particularly difficult because the compositions one is led to in developing a polyurethane foam containing a fire-retardant carbohydrate additive are ordinarily much different from the compositions one is led to in developing a polyurethane foam which will have satisfactory properties for other purposes, such as good cushioning for packaging.

Numerous patents disclose the use of unmodified carbohydrates as a substitute for a conventional polyol to prepare polyurethanes. Illustrative are U.S. Pat. Nos. 4,515,638; 4,417,998; 4,400,475; and Re. 31,757. While such polyurethanes may be foamed on conventional foaming equipment, the use of a carbohydrate in the absence of other conventional polyether or polyester polyols selected to produce flexible, cushioning foams results in a foam which is too brittle for commercial use. U.S. Pat. No. 4,404,294 suggests reacting a polyisocyanate in the presence of a polyol with water in which carbohydrates have been dissolved. The water-carbohydrate-polyol mix is not a compatible mix. Such a reaction would have to be carried out on foaming equipment capable of servicing three component streams. Alternately, polyurethane foams which are formed from aqueous slurries containing carbohydrates, such as described in U.S. Pat. No. 4,237,182, also require more expensive foaming equipment.

Numerous other patents disclose the addition of polysaccharides having a high degree of polymerization, such as starch and cellulose, to polyurethane resins. Illustrative are U.S. Pat. Nos. 3,956,202; 3,004,934; 3,957,702; 4,374,208; 4,458,034, 4,520,139; and 4,521,544. In all cases, the polysaccharide cannot be dissolved in the polyol component and must be processed as a solid. U.S. Pat. No. 3,956,202 to Iwasaki, which deals with rigid polyurethane foams, suggests reactions by which a polysaccharide might be made more soluble and more dispersible, but in the invention disclosed therein these compounds do not dissolve—they merely become more easily dispersible as solids. Other patents which disclose polyurethanes prepared from modified carbohydrates, such as U.S. Pat. Nos. 3,600,338 and 3,165,508, provide no suggestion as to how the carbohydrates may be solubilized in the polyol component. In all these cases, equipment servicing more than two components is required in order to prepare the desired foams.

Finally, numerous patents disclose polyurethanes prepared from modified carbohydrates in which the carbohydrates have been modified so that substantially all of hydrated carbons have been reacted, but such modified carbohydrates are of little use as char-forming fire-retardant agents. Illustrative of these disclosures are U.S. Pat. Nos. 3,004,934; 3,956,202; 3,957,702; 4,374,208; 4,458,034; 4,520,139; and 4,521,544.

Accordingly, it is an object of the present invention to provide a polyurethane foam which has cushioning properties satisfactory for use, for example as a packaging or insulation material, and contains a carbohydrate modified to a minimum extent as a fire-retardant additive.

An additional important object of the present invention is to provide a method of making such a foam on foaming equipment which is capable of servicing only two component streams.

A still further object of this invention is to provide a polyurethane resin for making such a foam, which resin is a single phase solution comprised of a polyol and a carbohydrate. Insofar as this applicant is aware, nothing in the prior art suggests how these objects can be achieved.

DESCRIPTION OF THE INVENTION

In accordance with the present invention, applicant provides a B-side resin for use in preparing a flexible, fire-retardant, polyurethane foam. The resin is a single phase solution comprising a polyol and a substituted carbohydrate substituted on one or more of its hydroxyl groups. The carbohydrate has at least one unsubstituted hydroxyl group, and the carbohydrate has an average degree of polymerization (DP) of not more than 8. The amount by weight of the carbohydrate should be at least 10% of the amount by weight of the polyol. The resin is preferably an aqueous solution containing up to 50% by weight of water, as a reactant for the blowing reaction. More preferably, from 1 to 20% by weight of water is included, with the inclusion of 7% by weight of water most preferred for a packaging foam.

A flexible, fire-retardant polyurethane foam can be prepared by mixing the B-side resin described above with an A-side resin comprised of a polyisocyanate. At least one of said resin solutions should further comprise a fire-retardant additive.

Preferred substituted carbohydrates are alkyl substituted carbohydrates such as alkyl glycosides having an alkyl radical containing from 2 to 20, or more preferably from 2 to 12, carbon atoms. Exemplary is butyl glucoside with an average degree of polymerization of 2 or less. Substituted carbohydrates which have an unsubstituted reducing group (the hydroxyl group adjacent the oxygen in the carbohydrate ring) are contemplated as being particularly suitable for the present invention.

A glycoside used herein could be a glucoside, fructoside, mannoside, galactoside, or any other acetal derived from the combination of a hydroxy compound with a sugar. Glucosides used in the present invention could be any alpha or beta substituted glucoside, with alpha alkyl D-glucosides preferred. The alkyl group can contain any degree of saturation or unsaturation, or any stable functional group, so long as the alkyl group serves to provide a hydrophobic tail which will solubilize the now modified carbohydrate in the polyol solution.

Typical fire-retardant compounds which may be included in the present invention may be characterized as compounds that contain elements from Group 5 or Group 7 of the periodic table. Especially suitable are those compounds that contain the elements chlorine, bromine, antimony, or phosphorus. These compounds may be used alone or in any combination with one another, or in combination with compounds containing Group 3 elements. The compounds can be either organic or inorganic. Examples of suitable fire-retardant compounds include, for example, chlorine compounds such as chlorinated hydrocarbons, sodium chloride and calcium chloride; bromine compounds such as decabromodiphenyloxide and decabromobiphenylether; antimony compounds such as antimony oxide and antimony oxychloride; and phosphorus compounds such as tricresyl phosphate, tris(2-chloroethyl)-phosphate, trix(chloropropyl)phosphate, 0, 0-diethyl-N, N-bis-(2-hydroethyl-)aminomethyl phosphate, tris(B-chlorethyl) phosphate, tris(dichloropropyl)-phosphate, tris(2,3-dibromopropyl)phosphate, dipropylene glycol phosphate, ammonium polyphosphate, and tetrakis (2-chloroethyl)-dichloroneopentyl diphosphate. Other suitable compounds generally include metal oxides, magnesium sulfate, alumina, borax and alkali-metal borates. A fire-retardant additive in the present composition is preferably included in the A-side resin. The amount of fire-retardant additive, by weight, in the A-side resin should be at least 10%, and more preferably 20% of the weight of the resin. The additive may be any one of, or combination of, the above-described fire-retardant compounds.

The polyol and the polyisocyanate used in practicing the present invention should preferably be selected so that the polyurethane foam has desired properties tailored for the intended end use. The criteria for selecting and blending such compounds to produce flexible, semi-rigid or rigid foams are well known in the art. The polyol can be any of the conventional polyols for use in forming polyurethane foams such as polyether polyols, polyester polyols, and block polymers of polyether and polyester polyols which are reactive with a polyisocyanate under the conditions of the foam-forming reaction. For packaging foams the range of molecular weight and range of hydroxyl numbers on the reactive polyols should preferably be consistent with the production of rigid, semi-rigid or flexible cushioning foams. The hydroxyl number range should be from 25 to 550, and preferably from 25 to 120. Most preferred is a 3000 molecular weight glycerine-based alkoxylated triol with a hydroxyl number of 56.

Suitable polyisocyanates for use in practicing the present invention include toluene diisocyanate, diphenyl methane diisocyanate, triphenyl diisocyanate, naphthalene diisocyanate, chlorophenyl-2,4-diisocyanate, ethylene diisocyanate, 1,4-tetramethylene diisocyanate, paraphenylene diisocyanate, hexamethylene diisocyanate, 3,3′-dimenthyl-4,4′-biphenylene diisocyanate, 3,3′-dimethoxy-4,4′-biphenylene diisocyanate, and diphenylmethane-4,4′-diisocyanate. Particularly preferred is diphenyl methane diisocyanate. Surfactants, catalysts and other additives known in the art can also be advantageously used in practicing the present invention.

The concept which is the present invention can be embodied in numerous different forms. The following examples are set forth to illustrate various preferred embodiments of the invention, and are not to be interpreted as restrictive of the invention. Quantities are expressed on a percent by weight basis unless otherwise indicated.

EXAMPLES 1-14

These examples illustrate the solubility, or phase stability, of carbohydrates and modified carbohydrates in model aqueous B-side polyurethane resins containing polyols. Results are set forth in Tables 1 and 2. Carbohydrates and carbohydrate derivatives are reported on a 100% solids basis.

TABLE 1

| | EXAMPLE | | | | | | |
|---|---|---|---|---|---|---|---|
| | 1 | 2 | 3 | 4 | 5 | 6 | 7 |
| Ingredient Formulation | | | | | | | |
| 3000 MW Triol, tipped with 10% EO | 47.6 | 45.5 | 47.6 | 47.6 | 47.6 | 45.5 | 46.7 |
| 15 mole EO adduct nonyl phenol | 19.0 | 18.2 | 19.0 | 19.0 | 19.0 | 18.2 | 18.7 |
| Trichlorofluoromethane | 14.3 | 13.6 | 14.3 | 14.3 | 14.3 | 13.6 | 14.0 |
| Water | 14.8 | 14.5 | 14.8 | 15.4 | 14.3 | 16.4 | 15.5 |
| High Fructose Corn Syrup | 4.3 | 8.2 | — | — | — | — | — |

TABLE 1-continued

| | EXAMPLE | | | | | | |
|---|---|---|---|---|---|---|---|
| | 1 | 2 | 3 | 4 | 5 | 6 | 7 |
| Mix alpha/beta Methyl Glucoside | — | — | 4.3 | — | — | — | — |
| Corn Syrup | — | — | — | 3.7 | — | — | — |
| Alpha Methyl Glucoside | — | — | — | — | 4.8 | — | — |
| Butyl Glucoside | — | — | — | — | — | 6.4 | — |
| 90% Fructose/ 10% Dextrose | — | — | — | — | — | — | 5.0 |
| Phase Stability Results: | | | | | | | |
| 20 Degrees C. | clear | clear | clear | clear | 2 phase | clear | 2 phase |
| 60 Degrees C. | 2 phase | 2 phase | 2 phase | 2 phase | 2 phase | clear | 2 phase |

TABLE 2

| | EXAMPLE | | | | | | |
|---|---|---|---|---|---|---|---|
| | 8 | 9 | 10 | 11 | 12 | 13 | 14 |
| Ingredient Formulation | | | | | | | |
| 3000 MW Triol, tipped with 10% EO | 62.5 | 60.6 | 57.7 | 59.7 | 63.8 | 55.0 | 63.8 |
| 12 mole EO adduct nonyl phenol | 10.4 | 10.1 | 9.6 | 10.0 | 10.6 | 9.2 | 10.6 |
| Trichlorofluoro-methane | 12.5 | 12.1 | 11.5 | 11.9 | 12.8 | 11.0 | 12.8 |
| Water | 8.0 | 8.1 | 13.9 | 12.7 | 7.4 | 11.9 | 8.7 |
| High Fructose Corn Syrup | 6.6 | — | — | — | — | — | — |
| Mix alpha/beta Methyl Glucoside | — | 9.1 | — | — | — | — | — |
| C10 Alkyl Glucoside, DP = 1.5 | — | — | 7.2 | — | — | — | — |
| C10 Alkyl Glucoside, DP = 3 | — | — | — | 5.7 | — | — | — |
| Alpha Methyl Glucoside | — | — | — | — | 5.3 | — | — |
| Butyl Glucoside | — | — | — | — | — | 12.8 | — |
| 90% Fructose/ 10% Dextrose | — | — | — | — | — | — | 4.1 |
| Phase Stability Results: | | | | | | | |
| 20 Degrees C. | 2 phase | clear | clear | clear | clear | clear | clear |
| 60 Degrees C. | 2 phase | 2 phase | clear | clear | 2 phase | clear | 2 phase |

Examples 1, 2, 3, 4, 7, 8, 9, and 14 show, at low percentages of added carbohydrates, phase instability at 60° C. In some cases, phase instability is even present at room temperature (20° C.). Since levels of carbohydrates below 10% in the B-side resin do not effectively alter combustion properties when combined with conventional polyols, the amount of carbohydrate must be at least 10% of the amount of polyol in order to achieve the desired effect.

Examples 5 and 12 show that the modification of dextrose to the methyl glucoside is not sufficient to render the modified carbohydrate soluble. Examples 6 and 13, however, show that modification of dextrose with n-butanol to butyl glucoside is a sufficient modification to render the carbohydrate soluble. Examples 10 and 11 similarly show that alkyl glucosides with average degrees of polymerization of 1.5 and 3, respectively, can be rendered soluble with 10 carbon (average) alkyl groups.

EXAMPLES 15-24

These examples set forth exemplary B-side polyurethane resins and the fire resistance of polyurethane foams prepared therewith.

The B-side resins set forth in Table 3 were reacted against an A-side resin comprised of 75% diphenyl methane diisocyanate, 5% trichlorotrifluoroethane, and 20% of a fire-retardant mixture comprised of 4.4% of a phosphorus compound, 13.5% of a chlorine compound, and 16% of a bromine compound. In the following examples the "A" and "B" side resins are each single phase. This mixing and reacting of the resins can be carried out with foam-in-place equipment capable of serving only two component streams.

Fire resistance is reported in terms of oxygen index performed by ASTM Method D-2863, "Measuring the Minimum Oxygen Concentration to Support Candle-like Combustion of Plastics". The higher oxygen concentrations required to sustain burning, as indicated by a higher oxygen index, is an indication of improved resistance to combustibility.

TABLE 3

| | EXAMPLE | | | | | |
|---|---|---|---|---|---|---|
| Ingredient | 15 | 16 | 17 | 18 | 19 | 20 |
| 4500 MW Triol, tipped with 10% EO | — | — | 76.0 | 56.0 | 25.0 | 17.5 |
| 700 MW Triol, All PO Polyol | — | — | — | — | 19.0 | 13.3 |
| 520 OHV All PO Sucrose Polyol | — | — | — | — | 18.0 | 12.6 |
| 3000 MW Diol, cloud pt. 58 Deg C. | 26.0 | 19.7 | — | — | — | — |
| Trimethyl ethanol ethylenediamine | 4.3 | 3.3 | 2.0 | 2.0 | 2.0 | 1.4 |
| 12 mole EO adduct nonylphenol | 9.6 | 7.3 | — | — | 15.0 | 10.5 |
| Trichlorofluoro-methane | — | — | — | — | 12.0 | 8.4 |
| Silicone surfactant, | 4.3 | 3.3 | 2.0 | 2.0 | 2.0 | 1.4 |

TABLE 3-continued

| Ingredient | EXAMPLE 15 | 16 | 17 | 18 | 19 | 20 |
|---|---|---|---|---|---|---|
| Y-6955 (UCC)* | | | | | | |
| Water | 55.8 | 49.6 | 20.0 | 18.0 | 7.0 | 13.9 |
| Butyl Glucoside | — | 16.9 | — | 22.0 | — | 21.0 |
| Ratio A:B by weight | 3/1 | 3/1 | 1.5/1 | 1.5/1 | 2/1 | 2/1 |
| Results: Oxygen Index | 21.5 | 22.5 | 20.5 | 21.5 | 21 | 22 |

(EO = ethylene oxide, PO = propylene oxide, OHV = hydroxyl value)
*A product of Union Carbide Corporation In Table 3, foam 16 (in which the modified dextrose, butyl glucoside, is solubilized) shows a higher resistance to combustion than the foam produced by formulation 15 prepared with conventional polyalkoxypropylene polyol. Similarly, foams by formulations 18 and 20 are improved in respect to resistance to combustion over foams by formulations 17 and 19, respectively, by virtue of substituting the solubilized alkyl glucoside for conventional polyols. It will be recognized that, since the carbohydrate has hydroxyl groups which will react with the polyisocyanate during the foaming reaction, the amount of the carbohydrates must be included in the calculation of equivalents of polyisocyanate to other substancection, the amount of the carbohydrates must be included in the calculation of equivalents of polyisocyanate to other substances which react with the polyisocyanate. An excess of substances which react with the polyisocyanate should be provided, so that at least 1, and more preferably at least 2, hydroxyl groups on each monomer of the carbohydrate remain unreacted.

Finally, turning to Table 4, example B-side resins 21, 22, 23 and 24, it can be seen that solubilization of alpha methylglucoside (AMG) by further derivatization of alpha methylglucoside to form a monoester, with an average of only 1 ester per carbohydrate chain, will provide B-side resins which will improve the flame resistance of polyurethane foams prepared therefrom over foams prepared with, for example, the B-side resin of example 19 (Table 3).

TABLE 4

| Ingredient | EXAMPLE 21 | 22 | 23 | 24 |
|---|---|---|---|---|
| 4500 MW Triol, tipped with 10% EO | 57.2 | 57.2 | 57.2 | 57.2 |
| 700 MW Triol, All PO Polyol | — | — | — | — |
| 520 OHV All PO Sucrose Polyol | — | — | — | — |
| 3000 MW Diol, cloud pt. 58 Deg C. | — | — | — | — |
| Trimethyl ethanol ethylenediamine | 2.5 | 2.5 | 2.5 | 2.5 |
| 12 mole EO adduct nonylphenol | 10.0 | 10.0 | 10.0 | 10.0 |
| Trichlorofluoro-methane | — | — | — | — |
| Silicone surfactant, Y-6955 (UCC)* | 10.3 | 0.3 | 0.3 | 0.3 |
| Water | 9.0 | 9.0 | 9.0 | 9.0 |
| Soyate ester of AMG | 21.0 | — | — | — |
| Laurate ester of AMG | — | 21.0 | — | — |
| Octanoate ester of AMG | — | — | 21.0 | — |
| 2 Ethylhexanoic acid ester of AMG | — | — | — | 21.0 |
| Ratio A:B by weight | 2/1 | 2/1 | 2/1 | 2/1 |
| Results: Oxygen Index | 22 | 22 | 22 | 22 |

*A product of Union Carbide Corporation

These examples (21, 22, 23 and 24) demonstrate that the substituted carbohydrate can be made soluble by substituting thereon solubilizing radicals other than alkyl groups. These embodiments are less preferred, as the more substitutions made on the carbohydrate, the less fire-retardant the carbohydrate becomes. Those skilled in the art will recognize other methods by which a solubilizing group may be put on the carbohydrate, such as by substituting an alkoxyl group thereon.

EXAMPLES 25-27

Carbohydrates other than glucose can be used to prepare flame-retardant polyurethane foams. B-side resins were prepared with butyl glucoside, butyl fructoside, and without a carbohydrate, respectively, and reacted with the same A-side resin as used to prepare the foams of examples 15-20 above. The results are set forth in Table 5. Both butyl glucoside and butyl fructoside were equally effective in increasing the fire resistance of the foam.

TABLE 5

| Ingredient | EXAMPLE 25 | 26 | 27 |
|---|---|---|---|
| 4500 MW Triol, tipped with 10% EO | 57.2 | 57.2 | 57.2 |
| 3000 MW Diol, cloud pt. 58 Deg C. | — | — | 24.0 |
| Trimethyl ethanol ethylenediamine | 2.5 | 2.5 | 2.5 |
| 12 mole EO adduct nonylphenol | 10.0 | 10.0 | 10.0 |
| Silicone surfactant, Y-6955 (UCC)* | — | 0.3 | 0.3 |
| Water | 6.0 | 6.0 | 6.0 |
| Butyl Glucoside | 24.0 | — | — |
| Butyl Fructoside | — | 24.0 | — |
| Ratio A:B by weight | 2/1 | 2/1 | 2/1 |
| Results: Oxygen Index | 21.5 | 21.5 | 20.5 |

*A product of Union Carbide Corporation

The foregoing embodiments are illustrative of the present invention rather than restrictive. Those modifications which come within the meaning and range of equivalents of the claims are to be included therein.

That which is claimed is:

1. A single phase solution for use in the preparation of fire-retardant polyurethane foams, said solution comprising a polyol and a carbohydrate having a solubilizing radical substituted thereon, said carbohydrate having at least one unsubstituted hydroxyl group, and said carbohydrate having an average degree of polymerization of not more than 8.

2. A single phase solution for use in the preparation of fire-retardant polyurethane foams, said solution comprising a polyol and an alkyl substituted carbohydrate having an alkyl radical containing from 2 to 20 carbon atoms, and having an average degree of polymerization of not more than 8, in an amount, by weight, of at least 10% of the amount by weight of said polyol.

3. A single phase solution as claimed in claim 2, wherein said alkyl substituted carbohydrate has at least its reducing group unsubstituted.

4. A single phase solution as claimed in claim 2, wherein said alkyl substituted carbohydrate is an alkyl glycoside.

5. A single phase solution as claimed in claim 4, wherein said alkyl glycoside is an alkyl glucoside.

6. A single phase solution as claimed in claim 5, wherein said alkyl glucoside is butyl glucoside with an average degree of polymerization of 2 or less.

7. A single phase aqueous solution for use in the preparation of fire-retardant polyurethane foams, said aqueous solution comprising a polyol having a hydroxyl number of from 25 to 120, an alkyl substituted carbohydrate having an alkyl radical containing from 2 to 20 carbon atoms, and water in an amount, by weight, of not more than 50%, said glycoside having an average degree of polymerization of not more than 8, and said glycoside being included in an amount, by weight of at least 10% of the amount by weight of said polyol.

8. A method for making a fire-retardant polyurethane foam, comprising:

(a) mixing a polyol with a carbohydrate having a solubilizing radical substituted thereon, said carbohydrate having at least one unsubstituted hydroxyl group, and having an average degree of polymerization of not more than 8, in an amount, by weight of at least 10% of the amount by weight of said polyol, to form a single phase solution;

(b) mixing said single phase solution with a second solution comprised of a polyisocyanate, and wherein at least one of said solutions further comprises a fire-retardant compound; and (c) allowing the mixture to foam.

9. A method for making a fire-retardant polyurethane foam, comprising:

(a) mixing a polyol with an alkyl substituted carbohydrate having an alkyl radical containing from 2 to 20 carbon atoms, and having an average degree of polymerization of not more than 8, in an amount, by weight, of at least 10% of the amount by weight of said polyol, to form a single phase solution;

(b) mixing said single phase solution with a second solution comprised of a polyisocyanate; and (c) allowing the mixture to foam.

10. A method for making a fire-retardant polyurethane foam as claimed in claim 9, wherein said alkyl substituted carbohydrate has at least its reducing group unsubstituted.

11. A method for making fire-retardant polyurethane foam as claimed in claim 10, wherein said alkyl substituted carbohydrate is an alkyl glycoside.

12. A method for making fire-retardant polyurethane foam as claimed in claim 11, wherein said alkyl glycoside is an alkyl glucoside.

13. A method for making a fire-retardant polyurethane foam as claimed in claim 12, wherein said alkyl glucoside is butyl glucoside with an average degree of polymerization of 2 or less.

14. A method for making a fire-retardant polyurethane foam, comprising:

(a) mixing a polyol, an alkyl substituted carbohydrate, and water to form a single phase aqueous solution, said polyol having a hydroxyl number of from 25 to 120, said substituted carbohydrate having an alkyl radical containing from 2 to 20 carbon atoms, and said carbohydrate having an average degree of polymerization of not more than 8, with said carbohydrate provided in an amount, by weight, of at least 10% of the amount by weight of said polyol, and with said water provided in an amount, by weight, of not more than 50% of the total weight of said single phase aqueous solution;

(b) mixing said single phase aqueous solution with a second solution comprised of a polyisocyanate and a fire-retardant additive; and (c) allowing the mixture to foam.

15. A method for making a fire-retardant polyurethane foam as claimed in claim 10, wherein said flame-retardant additive selected from the group consisting of chlorine compounds, bromine compounds, antimony compounds, phosphorus compounds, or any combination of the same.

16. A fire-retardant polyurethane foam comprising the reaction product of a polyisocyanate, a polyol, and a carbohydrate having a solubilizing radical substituted thereon, said carbohydrate having at least one unsubstituted hydroxyl group, and said carbohydrate having an average degree of polymerization of not more than 8, the amount, by weight, of said substituted carbohydrate being at least 10% of the amount by weight of said polyol, said polyurethane foam further comprising a fire-retardant additive, and wherein the amounts of said polyol, polyisocyanate and carbohydrate are selected so that at least one hydroxyl group on each carbohydrate remains unreacted.

17. A fire-retardant polyurethane foam comprising the reaction product of a polyisocyanate, a polyol, and an alkyl substituted carbohydrate having an alkyl radical containing from 2 to 20 carbon atoms, and having an average degree of polymerization of not more than 8, in an amount, by weight, of at least 10% of the amount by weight of said polyol, said polyurethane foam further comprising a fire-retardant additive, and wherein the amounts of said polyol, polyisocyanate and alkyl substituted carbohydrate are selected so that at least one hydroxyl group on each carbohydrate remains unreacted.

18. A fire-retardant polyurethane foam as claimed in claim 17, wherein said alkyl substituted carbohydrate has at least its reducing group unsubstituted.

19. A fire-retardant polyurethane foam as claimed in claim 17, wherein said alkyl substituted carbohydrate is alkyl glycoside.

20. A fire-retardant polyurethane foam as claimed in claim 19, wherein said alkyl glycoside is an alkyl glucoside.

21. A fire-retardant polyurethane foam as claimed in claim 20, wherein said alkyl glucoside is butyl glucoside with an average degree of polymerization of 2 or less.

22. A fire-retardant polyurethane foam comprising the reaction product of a polyisocyanate, a polyol, and an alkyl substituted carbohydrate, said polyol having a hydroxyl number of from 25 to 120, said substituted carbohydrate having an alkyl radical containing from 2 to 20 carbon atoms, and said carbohydrate having an average degree of polymerization of not more than 8, wherein the amount of said carbohydrate, by weight, is at least 10% of the amount by weight of said polyol, said polyurethane foam further comprising a fire-retardant additive, and wherein the amounts of said polyol, polyisocyanate, and alkyl substituted carbohydrate are selected so that at least one hydroxyl group on each carbohydrate remains unreacted.

23. A fire-retardant polyurethane foam as claimed in claims 12, 13 or 16, wherein said fire-retardant additive is selected from the group consisting of chlorine compounds, bromine compounds, antimony compounds, phosphorus compounds, or any combination of the same.

* * * * *

UNITED STATES PATENT AND TRADEMARK OFFICE
CERTIFICATE OF CORRECTION

PATENT NO. : 4,654,375
DATED : March 31, 1987
INVENTOR(S) : Nelson E. Malwitz

It is certified that error appears in the above-identified patent and that said Letters Patent are hereby corrected as shown below:

Column 7, Lines 25-27, please delete "substancection, the amount of the carbohydrates must be included in the calculation of equivalents of polyisocyanate to other".

Column 7, Line 56, "10.3" should be -- 0.3 --.

Signed and Sealed this

Fifteenth Day of September, 1987

*Attest:*

DONALD J. QUIGG

*Attesting Officer* *Commissioner of Patents and Trademarks*